Figure 1:
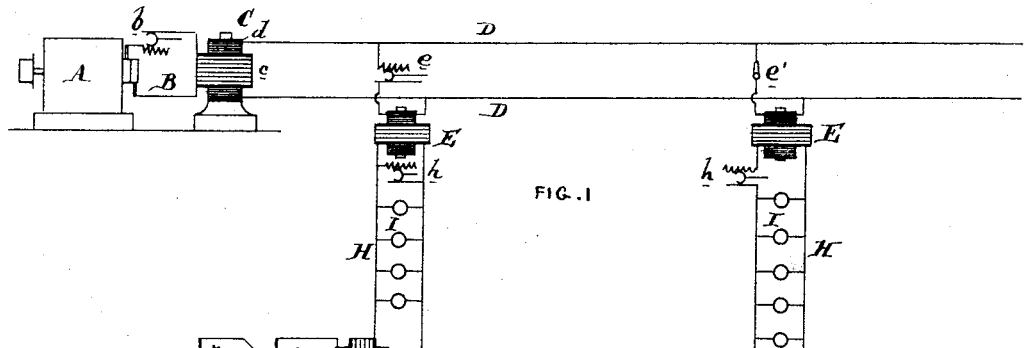

(No Model.)

R. M. HUNTER.
ELECTRICAL TRANSMISSION OF POWER.

No. 460,071. Patented Sept. 22, 1891.

Attest
S. T. Yerkes
A. J. Dunn

Inventor
R. M. Hunter

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRICAL TRANSMISSION OF POWER.

SPECIFICATION forming part of Letters Patent No. 460,071, dated September 22, 1891.

Original application filed November 9, 1887, Serial No. 254,672. Divided and application filed August 1, 1890, Serial No. 360,619. Again divided and this application filed November 24, 1890. Serial No. 372,523. (No model.)

*To all whom it may concern:*

Be it known that I, RUDOLPH M. HUNTER, of the city and county of Philadelphia, and State of Pennsylvania, have invented an Improvement in Electrical Transmission of Power, of which the following is a specification.

My invention has reference to electrical transmission of power; and it consists of certain improvements, all of which are fully set forth in the following specification and accompanying drawings.

This application, Case 183, is a division of my application, Case 158, Serial No. 360,619, filed August 1, 1890, which was in turn a division of my application, Serial No. 254,672, filed November 9, 1887.

The object of my invention is to carry out a method, by the employment of suitable apparatus, whereby the conversion of currents by means of induction apparatus may be accomplished in a more satisfactory manner, particularly when very high potential currents are to be transmitted.

Heretofore it has been customary to wind the generating-machine for alternating currents so as to directly produce currents of high tension or pressure, and such currents were conveyed over the line to the point where they were to be converted by the induction apparatus into currents of low intensity and greater volume for local use.

The main object in this system of transmission is to reduce the metal in the line conductors to a minimum and consequently make the expense of construction and interest on investment as small as possible; and, furthermore, this system is more particularly adapted for independent local divisions which are to be independently controlled without affecting the remaining divisions upon the circuit. There is considerable objection to winding the primary generator for high-tension currents, first, because of its expense, and, second, because of the danger to the insulation.

My object is therefore to employ a method which shall enable a generator (of whatever character it may be) to be wound for low-intensity currents, or those having small potential and great volume, and converting such low-potential currents into currents of high potential by means of an induction-coil or secondary generator and sending said high-tension current over a high-resistance line-circuit to be used at various places to again produce low-tension currents by induction. The high-potential current so generated may be far higher than it would be safe to attempt to make them by the employment of the winding of a dynamo alone, and by so increasing their potential I am enabled to still further reduce the size of the line-wire and the strength of its supports in conveying a given amount of electrical energy to a distant point. This is particularly advantageous where we employ secondary generating-stations for a large district and where one pair of feeders are to supply currents to a number of tertiary converters. The winding of the secondary generators is an extremely small undertaking as compared to the winding of the fine-wire coils of the dynamo-electric machine, and hence, if from any cause the insulation of the fine-wire coil of the induction-coil or secondary generator was destroyed, the expense of repair would be but a trifle compared with the same amount of destruction in the dynamo-electric machine.

In place of using alternating machines I may use continuous-current machines, with provisions for reversing or interrupting the current before it passes through the secondary generators.

In carrying out my improved method I do not limit myself to any particular details, as there are many equivalent constructions.

For illustrating several ways of putting my method into practice I have shown several drawings, which I will now describe.

Figure 2:
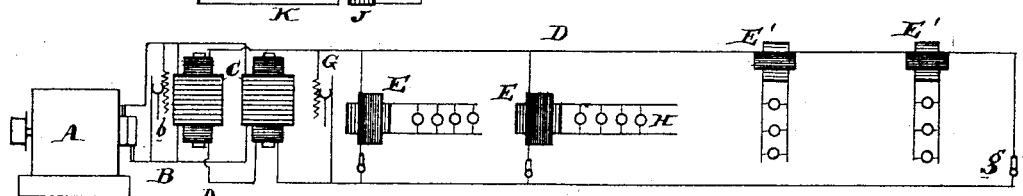
Figure 3:
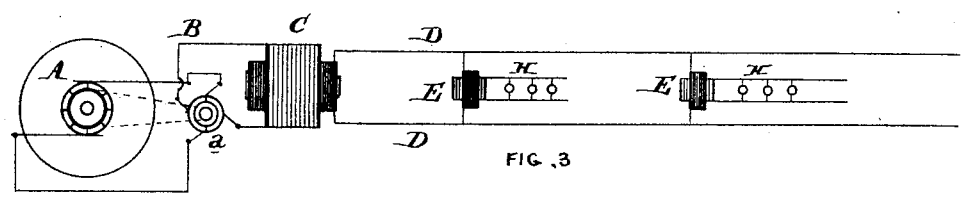
Figure 4:
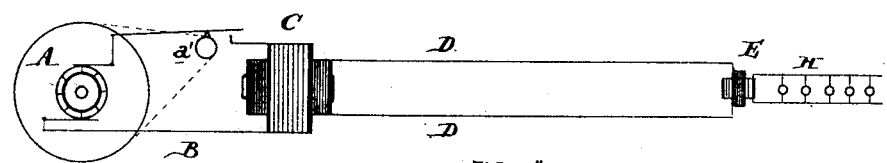

In the drawings, Figure 1 is a diagram of one form of apparatus for carrying out my invention, in which we have a single secondary generator in series with the primary generator and line and with the tertiary generators in multiple connection. Fig. 2 is a diagram illustrating two secondary generators in multiple with the primary generator and also the line-circuit, and with the tertiary generators, shown both in multiple and in series with the line-circuit. Fig. 3 is a diagram substantially similar to Fig. 1, with the exception that the primary generator is a continuous-current machine with a circuit-reverser; and Fig. 4 is substantially the same thing with a circuit-interrupter in place of the current-reverser.

A is the primary generator and is wound for low potential, and may be either an alternating-current machine or a continuous-current machine.

B is a local circuit, preferably having a resistance changer or regulator B b, of any suitable construction, and including the coarse wire c of a powerful induction-coil or secondary generator C. The fine wire d of the generator C is in circuit with the high-resistance line D, which may, if desired, be provided with a short-circuiting resistance-changer G, forming a shunt connection between the outgoing and return wires of the line.

E are the local or tertiary generators, and are simple forms of induction-coils, having their fine-wire coils connected to the line D in multiple. The current passing over said fine-wire coils may be regulated by a resistance-changer e or be cut out by a switch e'.

H are local circuits at various distances along the line and include the coarse wire of the said tertiary generators E.

I are lamps, motors, or other translating or current-consuming devices in said local circuits H, and h are current-regulators for said local circuits. If desired, a fourth generator J may have its coarse wire included in the distant local circuit H and its fine wire connected to a circuit K, including one or more lamps or other translating devices or current-consuming devices requiring higher tension. This would enable both forms of currents to be used at one place or building. The amount of current passing through the tertiary generators E E may also be regulated by a resistance changer or regulator G.

In Fig. 2, in place of a single secondary generator C, we have two sets of generators having their coarse wire coupled in multiple with the primary generator and their fine wire coupled in series with the line D to increase the tension of the current. In this case two of the tertiary generators are shown as arranged in multiple connection with the line, and two (marked E' E') are shown as in series with line. When these two latter are not used, the switch g may be opened.

It is preferable to arrange the local generators in parallel or multiple, as shown. The generators C, E, E', and J are all preferably made with iron cores. They may be made like any good induction apparatus employing primary and secondary coils.

In the construction shown in Fig. 3 we have a continuous-current generator and a current-reverser a in the local circuit B to convert the continuous current into an alternating current before it passes through the secondary generator. Otherwise this figure shows substantially the same system as Fig. 1.

In the case of Fig. 4 we have a current-interrupter a', located in the place of the current-reverser of Fig. 3. These various apparatuses show different ways for putting the same general invention into practice.

I am well aware that it may be argued that the double conversion of the current in the manner proposed is objectionable on the ground of loss of energy from that which should theoretically be obtained; but it will be found that the practical advantages to be derived from this system of transmission of electrical energy have far greater merits than the contemporaneous objections. Less care in the handling of the apparatus and less skill on the part of the operator would be required with my improvement, which, aside from the other advantages, is not to be ignored. It is also evident that, while this invention is especially adapted to the employment of high-tension currents in the line, it is not so limited.

Having now described my invention, what I claim as new, and desire to secure by Letters Patent, is—

1. The method of transmitting electric energy, consisting in generating by induction currents of low intensity and of alternately increasing and decreasing potential, then converting them by induction into currents of high intensity, transmitting the induced currents of high intensity by a line-circuit to a distant place, and then reconverting by induction said high-intensity currents back again into low-intensity currents and supplying said low-intensity currents to one or more local circuits containing translating or current-consuming devices.

2. The method of transmitting electric energy, consisting in generating by induction currents of low intensity and of alternately increasing and decreasing potential, then converting them by induction into currents of high intensity, transmitting the induced currents of high intensity by a line-circuit to a a distant place, then reconverting by induction said high-intensity currents back again into low-intensity currents, supplying said low-intensity currents to one or more local circuits containing electric translating devices or current-consuming devices, and regulating the currents in the distant circuits by varying the currents in the primary circuit.

3. The method of transmitting electric energy, consisting in generating by induction a current of low intensity and of alternately increasing and decreasing potential, dividing such current and passing such divisions of current through the coarse-wire primary coils of two or more induction-coils arranged in multiple, then uniting the induced currents generated in the secondary coils of fine wire in series and passing such high-tension current to the line-circuit.

4. The method of transmitting electric energy, consisting in generating by induction a current of low intensity and of alternately increasing and decreasing potential, dividing such current and passing such divisions of current through the coarse-wire primary coils of two or more induction-coils arranged in multiple, then uniting the induced currents generated in the secondary coils of fine wire in series and passing such high-tension current to the line-circuit and subsequently reconverting by induction the high-tension currents into low-tension currents and supplying said low-tension currents to translating or current-consuming devices.

5. The herein-described method for the transmission of electrical energy, which consists in generating by induction low-potential currents, converting said low-potential currents into high-potential currents of alternating sign by induction and transmitting said high-potential currents over a line-circuit, dividing said high-potential currents, and by induction generating independent low-potential currents by the independent employment of said divided high-potential currents, and energizing independent translating or current-consuming devices by said independently-generated low-potential currents.

6. The herein-described method for the electrical transmission of energy, which consists in producing currents of one potential by induction in a mechanically-operated apparatus having coils of wire, immediately transforming said currents by induction into currents of high potential and of alternating sign, transmitting said high-potential currents to a distance over a line-circuit, transforming said high-potential currents into a low-potential current by induction, and energizing current consuming or translating devices by said low-potential current.

7. The herein-described method for the electrical transmission of energy, which consists in producing currents of one potential by induction in a mechanically-operated apparatus having coils of wire, immediately transforming said currents by induction into currents of high potential and of alternating sign, transmitting said high-potential currents to a distance over a line-circuit, subdividing said high-potential currents, and producing by the separate subdivisions independent low-potential induced currents, and circulating said low-potential induced currents in independent circuits.

In testimony of which invention I have hereunto set my hand.

R. M. HUNTER.

Witnesses:
 ERNEST HOWARD HUNTER,
 S. T. YERKES.